United States Patent
Matsuda

[19]

[11] Patent Number: 6,155,945
[45] Date of Patent: Dec. 5, 2000

[54] SILENT CHAIN WITH CONVEX OUTER FLANKS FOR SMOOTH SPROCKETS TOOTH ENGAGEMENT

[75] Inventor: Akio Matsuda, Nabari, Japan

[73] Assignee: Borg-Warner Automotive K.K., Japan

[21] Appl. No.: 09/232,079

[22] Filed: Jan. 15, 1999

[30] Foreign Application Priority Data

Jan. 29, 1998 [JP] Japan ................... 10-034227

[51] Int. Cl.$^7$ .................................................. F16G 13/04
[52] U.S. Cl. .......................... 474/212; 474/213; 474/214
[58] Field of Search ..................... 474/200–260

[56] References Cited

U.S. PATENT DOCUMENTS

| | | | |
|---|---|---|---|
| 1,560,647 | 11/1925 | Belcher | 474/214 X |
| 4,759,740 | 7/1988 | Cradduck | 474/212 |
| 4,854,925 | 8/1989 | Chandrupatia | 474/214 X |
| 5,154,674 | 10/1992 | Avramidis et al. | 474/214 |
| 5,236,400 | 8/1993 | Tsuyama | 474/217 |
| 5,267,910 | 12/1993 | Maruyama et al. | 474/212 |
| 5,419,743 | 5/1995 | Takeda | 474/157 |
| 5,989,140 | 11/1999 | Ichikawa et al. | 474/226 X |

FOREIGN PATENT DOCUMENTS

| | | |
|---|---|---|
| 487146 | 5/1992 | European Pat. Off. . |
| 443581 | 9/1912 | France . |
| 4-44543 | 4/1992 | Japan . |
| 105636 | 5/1992 | Japan . |

*Primary Examiner*—David A. Bucci
*Assistant Examiner*—Marcus Charles
*Attorney, Agent, or Firm*—Sidley & Austin; Greg Dziegielewski

[57] ABSTRACT

A silent chain and sprocket for power transmission includes a silent chain formed of interleaved rows of multiple link plates and a sprocket used with the silent chain. Each of the teeth of the chain links is formed of an outside flank and an inside flank, and a protrusion is formed on the outside flank in the vicinity of the aperture. At the onset of meshing with the sprocket, the inside flanks of the link plates of the link rows contact the sprocket teeth. As engagement proceeds, the points of engagement of the links with the sprocket teeth are transferred from the inside flanks of the links of a first row to the outside flanks of the links of the preceding adjacent row, and the chain is seated on the outside flanks of the links. The point of projection of the engagement endpoint on the inside flank onto the outside flank coincides with the engagement transfer point on the outside flank or is in the vicinity of the engagement transfer point.

5 Claims, 3 Drawing Sheets

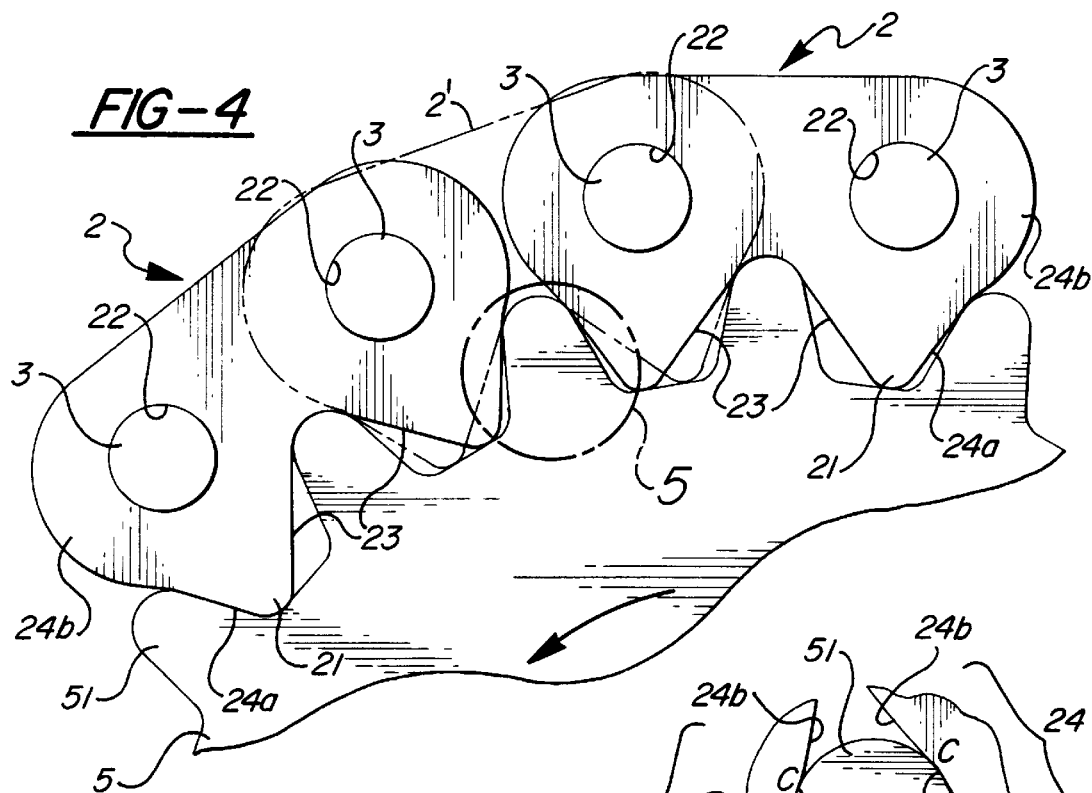
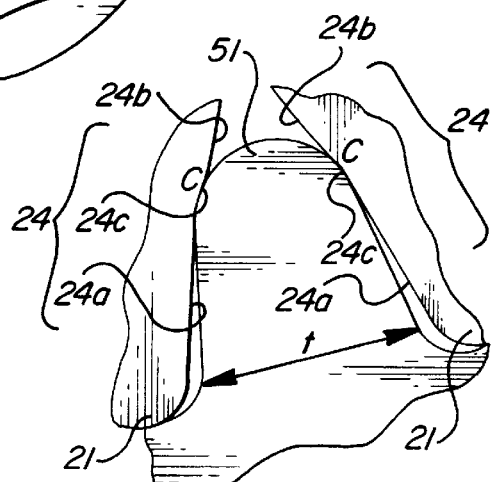
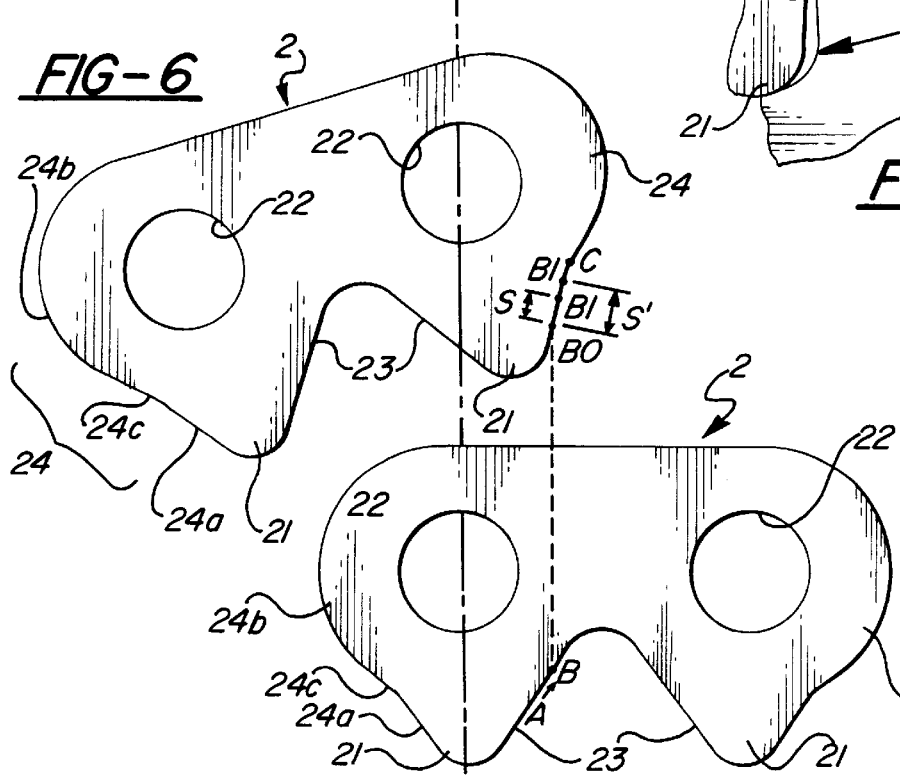

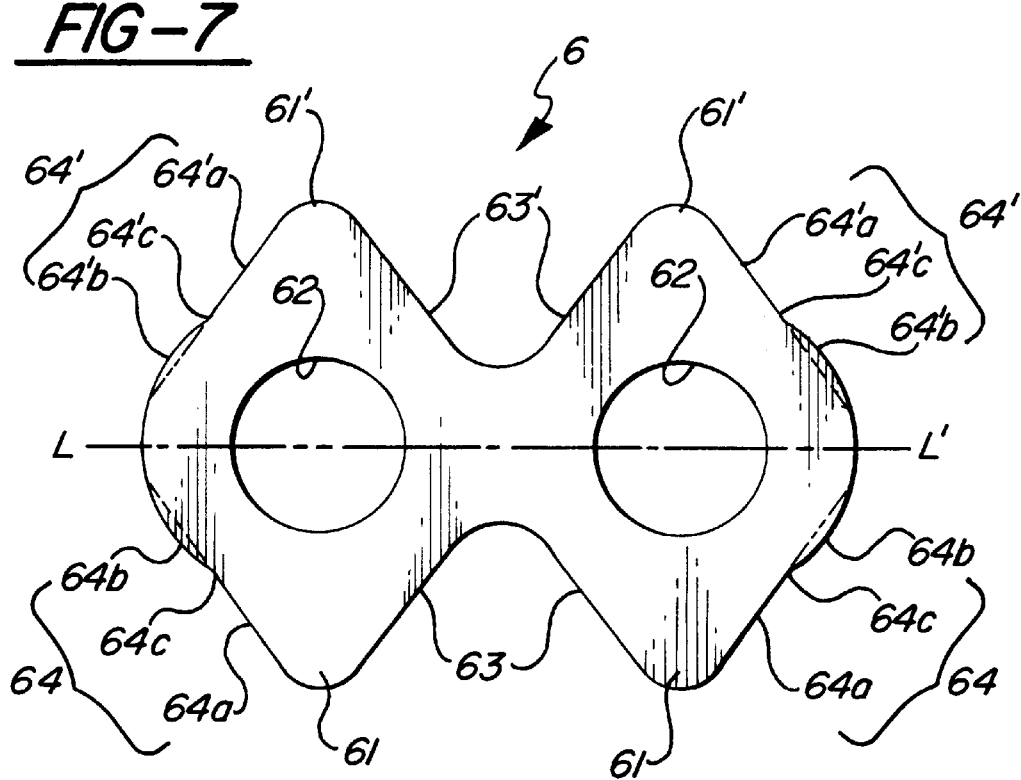
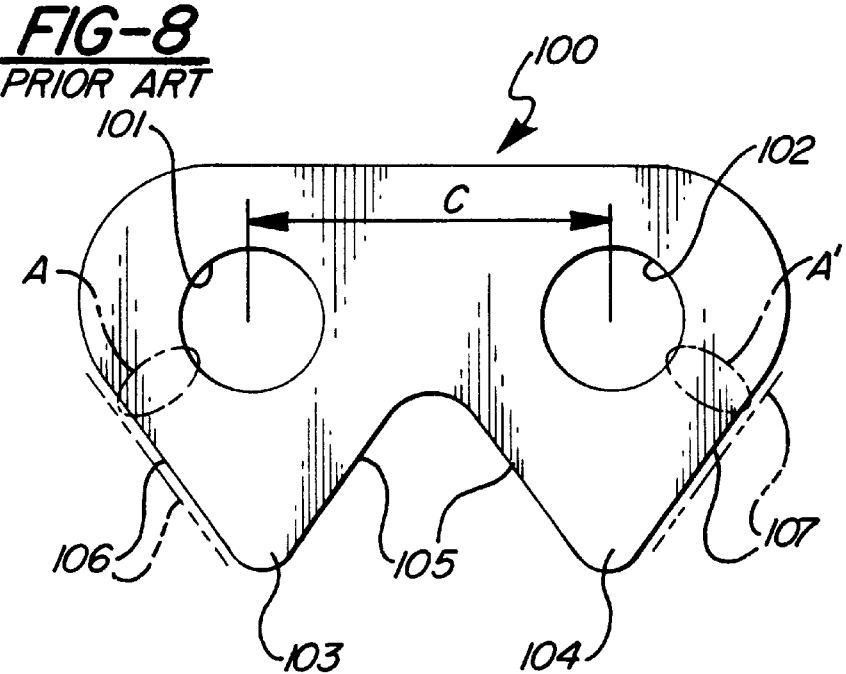

SILENT CHAIN WITH CONVEX OUTER FLANKS FOR SMOOTH SPROCKETS TOOTH ENGAGEMENT

BACKGROUND OF THE INVENTION

This invention relates to a silent chain power transmission device and, in particular, it relates to a silent chain, or inverted tooth chain, having a plurality of rows of links. The links are interleaved and connected by a connecting pin inserted in the apertures of each of the link plates. In its preferred embodiment, the chain links have teeth with convex outer flanks for seating with the teeth of the corresponding sprocket that is used with the silent chain.

Silent chains are used conventionally as power transmission chains for automobiles and motorcycles in engine timing systems as well as in transmissions and transfer cases for four-wheel drive vehicles. In general, a silent chain is comprised of multiple link plates, each of which has a pair of teeth. Each link typically includes a pair of apertures. The links are interleaved or connected by connecting pins placed in the link apertures.

FIG. 8 shows an example of a link plate of a conventional silent chain. In FIG. 8, link plate 100 has a pair of apertures or pinholes 101, 102 for insertion of the connecting pins and a pair of depending or downwardly extending teeth 103, 104 that engage with the teeth a sprocket (not shown). The teeth are joined at crotch area 105, which is formed of the inside link flanks. Tooth 103 includes inside flank 105a and outside flank 106 and tooth 104 is composed of inside flank 105b and outside flank 107.

When the silent chain comprised of multiples of links such as link plate 100 is operated, tension acts along the entire length of the chain. Thus, pressure from the connecting pins, in the direction to expand the pinhole center distance (or pitch) C, acts on pinholes 101, 102 of link plate 100.

As a result, cracks or breakage can occur in region A (or A') where the distance between the edge of pinhole 101 (or 102) and outside flank 106 (or 107) is the smallest. Therefore, as shown by the double dotted line in FIG. 8, the distance between the pinhole edge and the outside flank is conventionally made larger by placing outside flanks 106, 107 more toward the outside than conventional outside flanks 106, 107, shown by a solid line, for increasing the strength of the link plate in regions A, and A' in the prior art construction.

However, in this case, although the strength of the link plate increases, the thickness of the sprocket that engages with outside flanks 106, 107 of link plate 100 is typically correspondingly decreased. As a result, the strength of the sprocket teeth decreases.

The assignee of the present application has proposed a silent chain that can increase the strength of the link plate without decreasing the strength of the sprocket teeth and address such conventional problems, which is set forth in U.S. patent application Ser. No. 09/204,034, filed Dec. 1, 1998, the subject matter of which is incorporated herein by reference.

In that prior application, a protrusion is formed only in regions A, A' on the outside flank, and not along the entire link flank. Therefore, the strength and thickness of the sprocket teeth are ensured without decreasing the strength of the teeth and the strength of regions A, A' and the entire link plate is improved.

However, in the case of a silent chain of inside flank engagement (or crotch engagement) and outside flank seating (or outer-crotch seating), the inside flank (inner crotch) of the link plate of a certain link row engages first with the sprocket tooth and the point of engagement transfers on the inside flank along the progression of engagement.

When engagement with the sprocket tooth progresses further, the sprocket tooth engagement point on the inside flank of the link transfers onto the outside flank (outer crotch) of the link plate of the link row which is adjacent to the first link row, and, when engagement progresses, it moves along the outside flank and the engagement ends at a certain point. This final point is the seating point.

In the development of the chain of the present invention, the engagement mechanism of the silent chain of the conventional inner flank engagement followed by outer flank seating was analyzed in detail. The analysis showed that the transfer of load from the inside flank to the outside flank is not smooth during transfer of the engagement point from the inside flank to the outside flank because of the distance between the point of the end of engagement on the inside flank and the point of the start of engagement on the outside flank (i.e. engagement transfer point). Noise is generated as a result of the lack of smooth transfer.

Accordingly, the noise vibration performance of the silent chain (i.e., noise-vibration properties) is thought to be improved if the transfer of load during the engagement can be made smoothly. The present invention addresses such a problem and its purpose is to offer a silent chain power transmission device that improves the strength of the link plate of a silent chain without decreasing the strength of the sprocket teeth, making transfer of engagement from the inside flank to the outside flank smoother, thereby improving noise/vibration of the silent chain.

SUMMARY OF THE INVENTION

In its preferred embodiments, the silent chain or power transmission device of the present invention comprises a silent chain having multiple rows of links. Each of the link rows is comprised of multiple link plates. The link plates are connected together by pins received in the pair of apertures in each of the link plates. Each of the link plates includes at least a pair of teeth constructed and arranged for engagement with the teeth of a corresponding a sprocket. Each of the teeth includes an outside flank and inside flank. A protrusion is formed on the outside flank in the vicinity of each of the apertures.

A sprocket is used with the silent chain. At the onset of meshing with the sprocket, the inside flanks of the link plates of first link row contact the sprocket teeth. As engagement proceeds, the engagement point is transferred from the inside flanks to the outside flanks of the link plates of the link rows preceding but adjacent to the first link rows. The chain is seated on the outside flanks of the link plates and the projected points of the ending points of engagement on the inside flanks toward the outside flanks coincide with the transferred engagement points on the outside flanks or are disposed in the vicinity of the transferred engagement points on the outside flanks.

In its preferred embodiment, each of the outside flanks of the links of the silent chain includes a generally flat surface formed on the tip portion of each of the outside flanks. A convex curved surface protrudes outwardly from the generally flat surface in the vicinity of each of the apertures. A concave curved surface connects the generally flat surface with the convex curved surface. The seating point on the outside surface is located on the concave curved surface.

The convex curved surface of the outside flank may be arcuately shaped. In another embodiment, the link plates are back-drive-type link plates and each includes a pair of teeth on both of the opposite sides of the center line of the apertures.

In the silent chain of this invention, a projection part is formed only in the vicinity of an aperture or pinhole on the outside flank. Therefore, the thickness of the sprocket teeth is ensured, decrease of sprocket teeth strength is prevented and the strength of the pinhole region of the link plate and that of the entire link plate can be improved.

In this invention, engagement starts from the inside flank of the link plate and the engagement point moves to the outside flank of the link plate of the adjacent link row as the engagement progresses. It seats on the outside flank and the point of projection of the engagement endpoint on the inside flank agrees with the engagement-transfer point on the outside flank or is positioned in the vicinity of the engagement transfer point. Therefore, the sprocket teeth do not collide with the outside flank when the engagement point moves from the inside flank to the outside flank. The engagement point moves smoothly from the inside flank to the outside flank and transfer of the load from the inside flank to the outside flank is smooth. Thereby, noise due to vibration is lessened or improved.

Incidentally, "in the vicinity" here is the positioning of the engagement endpoint on the inside flank of the link plate at close proximity to the engagement-transfer point on the outside flank of the link plate in a link row which is adjacent to the link row. In other words, "in the vicinity" means a small distance between the engagement-transfer point on the outside flank and the engagement endpoint on the inside flank, as viewed in the transverse or chain-width direction. The larger this distance, the greater the force of collision of the sprocket teeth with the outside flank when the engagement point moves from the inside flank to the outside flank and the larger the noise of engagement. Therefore, the distance between the engagement endpoint on the inside flank and the engagement-transfer point on the outside flank is preferably to be zero or as close to zero as possible.

Moreover, the outside flank has a nearly straight flat surface formed at the tip of the tooth. A convex surface protrudes outward from the flat surface in the vicinity of the pinhole. A concave surface connects the flat surface and the convex surface. It is preferable that the seating point on the outside flank be on the concave surface. The convex curved surface is also preferably an arcuate surface and the concave surface is also, preferably, an arcuate surface. Furthermore, the link plate can be constructed for a back-surface driving chain and have a pair of teeth on both sides of the pinhole center line.

Positioning of the seating point on the outside flank of the concave surface reduces surface pressure that acts on the link plate and sprocket teeth during power transmission. In contrast, in a conventional silent chain, the surface pressure is great, in general, because of the contact of the flat or convex surface of the link plate with the convex surface of the sprocket teeth.

BRIEF DESCRIPTION OF THE DRAWINGS

A preferred embodiment of this invention is explained with reference to the attached drawings. In the drawings:

FIG. 4 illustrates the engagement of the link plate of the silent chain of the present invention with the sprocket.

FIG. 5 is an enlargement of a portion of FIG. 4.

FIG. 6 illustrates the position of the engagement point on each link plate of the link rows next to each other.

FIG. 7 illustrates another embodiment of the link plate of the present invention in the form of a link for a back-drive chain.

FIG. 8 illustrates a link plate of the prior art.

DETAILED DESCRIPTION OF THE PREFERRED EMBODIMENTS

Figure 1:
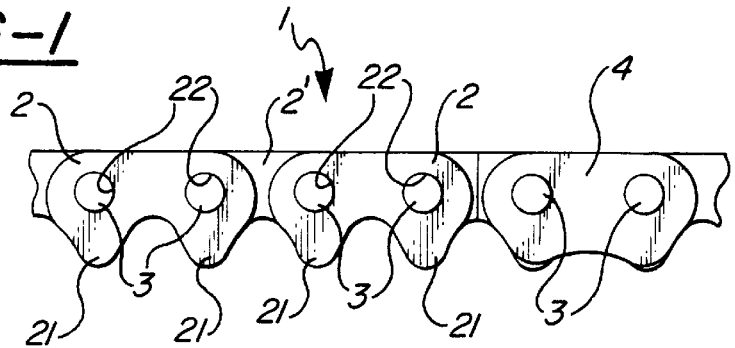
FIG. 1 is a front view of a portion of a silent chain of the present invention.
Figure 2:
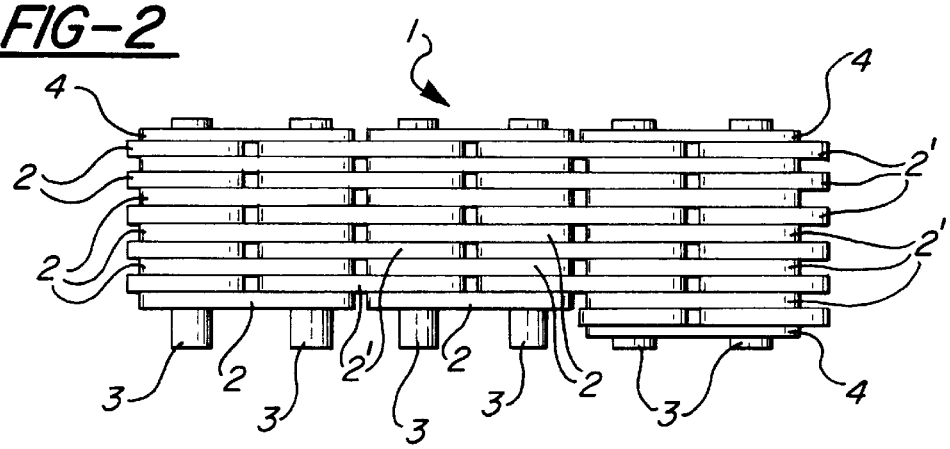
FIG. 2 is a plan view of the chain of FIG. 1.

As shown in FIGS. 1 and 2, multiple link plates 2, each with a pair of depending teeth 21 and a pair of apertures, or pinholes 22, are placed in rows and interleaved to form silent chain 1. Link plates 2 are pivotally connected by inserting connecting pin 3 in pinhole 22 of these link plates 2. Guide links 4 are placed on the outermost side of link plate 2 in this silent chain.

Figure 3:
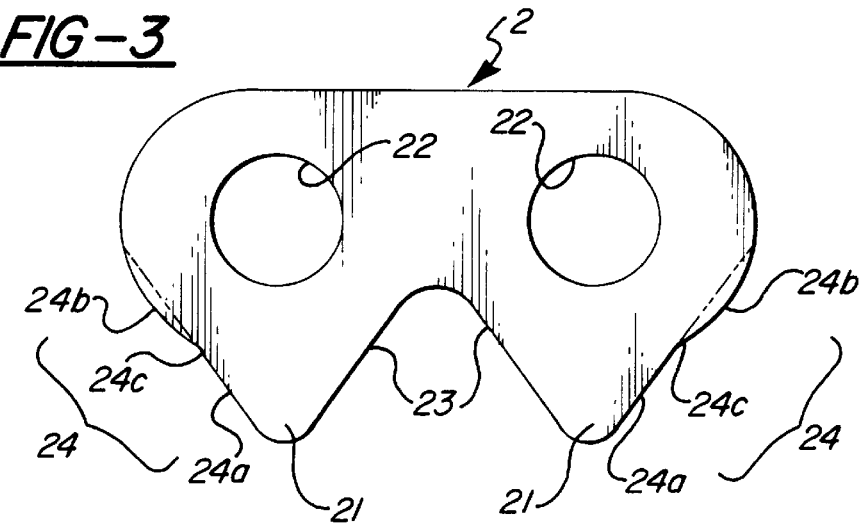
FIG. 3 is an enlarged front view of the link plate of the present invention.

Tooth 21 of link plate 2 is comprised of inside flank 23 and outside flank 24, as shown in FIG. 3. Inside flank 23 has a nearly straight flat surface or slightly curved surface. Outside flank 24 has a nearly straight flat surface 24a at the tip of tooth 21 and a convex surface 24b in the vicinity of pinhole 22. The convex surface protrudes outward from flat surface 24a and a concave surface 24c of a small radius of curvature connects the above surfaces. The double-dotted line in FIG. 3 is the extension of flat surface 24a and it indicates the conventional outside flank of a link of the prior art. Also, convex surface 24b and concave surface 24c are preferably arcuate surfaces.

Formation of convex surface 24b on outside flank 24, as shown above, increases the material link thickness in the vicinity of pinhole 22 on outside flank 24 and thereby the strength of link plate 2 is increased.

Engagement of silent chain 1, having multiple link plates 2, shown in FIG. 3, with a corresponding sprocket is shown in FIG. 4. In FIG. 4, link plates 2 only within a single plane in the lengthwise direction of the chain are shown by the solid line for the convenience of illustration. The portion of the link plate on the front or back side of the solid line link is shown by a double-dotted line. This figure illustrates the condition of completion of engagement of link plate 2 with teeth 51 of sprocket 5. That is, the condition of seating of link plate 2 on sprocket teeth 51 is shown. The arrow in the figure shows the direction of rotation of sprocket 5.

FIG. 5, which is an enlargement of part V of FIG. 4, shows seating point C on outside flank 24 of link plate 2. As shown in the figure, seating point C is on concave surface 24c of outside flank 24. Placement of seating point C on concave surface 24c reduces the surface pressure that acts on link plate 2 and sprocket teeth 51, thereby improving the durability of the entire chain.

Convex surface 24b on outside flank 24 forms the only projecting part of the flank and it only projects in the vicinity of pinhole 22 on outside flank 24, which enables thickness t of sprocket teeth 51 to be maintained and not reduced. The avoidance of reduction of the thickness of the sprocket tooth prevents the decrease of strength of sprocket teeth 51.

The engagement point on the link plate is shown in FIG. 6. FIG. 6 shows link plates in adjacent rows (i.e., adjacent in the longitudinal direction of the chain) indicated by the solid line and double-dotted line respectively in FIG. 4 at some interval between them for the convenience of illustration. That is, link plate 2 is that of a certain link row and link plate 2' is that of the link row which is adjacent to the first link row in the longitudinal direction or the direction of travel of the chain.

At the start of engagement with sprocket teeth 51 (FIG. 4), point A on inside flank 23 of link plate 2 engages with sprocket tooth 51. At the start of engagement, the leading row with link 2' has not yet begun to articulate, or has only undergone a minimal articulation, so that the sprocket tooth contacts the inside flank of the link 2 at a first engagement point, rather than the outside flank of link 2'. The engagement progresses as the chain is wound around sprocket 5 and the engagement point with the sprocket teeth 51 moves from point A to point B on inside flank 23 as the engagement progresses. This point B is the point of the end of engagement or second engagement point on inside flank 23.

Since the leading row with link 2' has entered the sprocket and begun to articulate, engagement with sprocket teeth 51 progresses further toward the crotch in the link row of link plate 21 more than in the link row of link plate 2. When the engagement progresses further from engagement point B on inside flank 23 of link plate 2, the engagement point moves from inside flank 23 of link 2 to a third engagement point on outside flank 24 of link 2'. $B_1$ is the engagement transfer point (third engagement point) on outside flank 24 during such engagement transfer. During this engagement, link 2 and link 2' both articulate as they enter and progress around the sprocket.

When engagement progresses further from such condition, the engagement point moves on outside flank 24 and reaches point C on concave surface 24c. This point C is the seating point which is the point of the end of the engagement.

Here, if $B_0$ is given to indicate the point of projection of second engagement point B on inside flank 23 of link plate 2, in the direction of chain width, then point $B_0$ is positioned somewhat outside of flat surface 24a or concave surface 24c of outside flank 24 and distance s between point $B_0$ and point $B_1$ is very small or zero. Incidentally, in FIG. 6, distance s between points $B_0$ and $B_1$ is exaggerated for the purposes of illustration.

Point $B_1'$ in FIG. 6 is the engagement transfer point from the inside flank to the outside flank of the conventional silent chain. Here, distance s' between points $B_0$ and $B_1'$ is such that s'>s. That is, the engagement point moves from engagement endpoint B on the inside flank to engagement transfer point $B_1'$ on the outside flank during engagement transfer from the inside flank to the outside flank in a conventional silent chain, and the distance between projection point $B_0$ of engagement point B on the outside flank surface and engagement transfer point $B_1'$ is large.

Accordingly, the sprocket teeth collide with the outside flank 24 when the engagement point moves from the inside flank 23 to the outside flank 24 and noise is generated.

In this embodiment of the present invention, distance s between points $B_0$ and $B_1$ is zero or very small (i.e., substantially or nearly coincident), so that collision between outside flank 24 and sprocket teeth 51 does not occur during transfer of the engagement point from engagement endpoint B on the inside flank 23 of link plate 2 to engagement transfer point $B_1$ on outside flank 24, and transfer of the engagement point from inside flank 23 to outside flank 24 is smooth. Thereby, transfer of load from inside flank 23 to outside flank 24 is smooth for improved noise/vibration performance. Accordingly, the present invention is directed to minimization of the distance s between $B_0$ and $B_1$ so that the transfer between inside and outside flank is as smooth as possible.

The present invention can also be applied to the so-called back-driving silent chain. FIG. 7 shows the back-driving link plate. In the figure, link plate 6 has a pair of teeth 61, 61' on both sides of center line L-L' of pinholes 62. Tooth 61 is composed of inside flank 63 and outside flank 64 and tooth 61' is composed of inside flank 63' and outside flank 64'.

Inside flanks 63, 63' are composed of a nearly straight flat surfaces or slightly curved surfaces. Outside flank 64 is composed of a nearly straight flat surface 64a formed at the tip of tooth 61. A convex surface 64b formed in the vicinity of pinhole 62 and a concave surface 64c of small radius of curvature connects flat surface 64a and convex surface 64b.

Similarly, outside flank 64' is composed of a nearly straight flat surface 64'a formed at the tip of tooth 61'. Convex surface 64'b is formed in the vicinity of pinhole 62, and concave surface 64'c of small radius of curvature connect flat surface 64'a and convex surface 64'b. Incidentally, the double-dotted line in FIG. 7 is the extension of flat surface 64a or 64'a and it indicates a conventional outside flank. Convex surfaces 64b, 64'b and concave surfaces 64c, 64'c are preferably arcuate surfaces.

As explained above, formation of convex surfaces 64b, 64'b on outside flanks 64, 64' increases the material thickness in the vicinity of pinhole 22 of outside flanks 64, 64' and increases the strength of link plate 2. At the same time, it ensures the thickness of the sprocket teeth that engage with link plate 6 and thereby prevent the decrease of strength of the sprocket teeth.

The engagement mode of the back-driving silent chain having such multiple link plates 6 with sprocket is entirely the same for teeth 61, 61' as the case in FIGS. 4 and 5. That is, the seating point on outside flank 64 of link plate 6, as regards the sprocket teeth, is positioned on concave surface 64c and the seating point on outside flank 64' of link plate 6, as regards the sprocket teeth, is positioned on concave surface 64'c. Thereby, the surface pressure that acts on the sprocket and outside flanks 64, 64' is reduced.

Furthermore, the mode of engagement with sprocket teeth of the link row of link plate 6 and link row adjacent to the link row on the side of engagement progression is entirely the same as that in FIG. 6. That is, the point of projection of the engagement endpoint on inside flank 63 (or 63') of link plate 6, onto the outside flank of the link plate on the side of engagement progression agrees with the engagement transfer point on the outside flank or it is in the vicinity of the engagement transfer point.

Thus, transfer of the engagement point from inside flank 63 (or 63') to the outside flank is smooth and without collision of the sprocket teeth with the outside flank when the engagement point moves from engagement endpoint on inside flank 63 (or 63') of link plate 6 to the outside flank of the link plate on the side of engagement progression, and transfer of the load from inside flank 63 (or 63') to the outside flank is smooth. As a result, the noise/vibration properties are improved.

As explained above, the projected part is formed only in the vicinity of the pinhole on the outside flank in the silent chain power transmission device of this invention. Therefore, the thickness of the sprocket teeth can be ensured, a decrease of the strength of the sprocket teeth is prevented and the strength of the pinhole region of the link plate and the entire link plate can be improved.

In addition, the inside flank engages with the sprocket teeth at the start of sprocket engagement in this invention, the engagement point moves from the inside flank to the outside flank as the engagement progresses, and the outside flank seats on the sprocket teeth. Furthermore, the point of projection of the engagement endpoint on the inside flank onto the outside flank coincides with the engagement transfer point on the outside flank or is in the vicinity of the engagement transfer point.

Therefore, the engagement point transfers smoothly from the inside flank to the outside flank without collision of the sprocket teeth with the outside flank and the transfer of load from the inside flank to the outside flank is smooth. As a result, noise/vibration performance can be improved.

What is claimed is:

1. A silent chain and sprocket comprising:

a silent chain having a plurality of rows of interleaved link plates (2, 2'), each of said link plates having a pair of apertures (22, 22) and at least one pair of teeth (21, 21), said teeth being adapted to contact the teeth (51) of an associated sprocket, a plurality of pivot pins (3) being inserted into said apertures to interconnect said link plates and to permit the articulation of said rows of interleaved link plates, each of said teeth having an outside flank (24) and inside flank (23), each said outside flank extending along a surface of said link plate from a first end adjacent a tip portion (21) of said tooth to a second end in the vicinity of said link aperture (22), each said outside flank having three portions between said first end and said second end, said three portions including a first flat portion near said first end, a second convex portion near said second end, and a third concave portion interconnecting said first flat portion and said second convex portion, said first flat portion having a flat surface (24a) formed adjacent said tip portion and extending toward said second end, said second convex portion having a convex curved surface (24b) protruding in a direction outward from said flat surface adjacent said second end and away from said aperture, and said third concave portion having a concave surface (24c) connecting said flat surface (24a) with said convex curved surface (24b);

an associated sprocket (5) for use with said silent chain, said sprocket having a plurality of sprocket teeth (51) disposed about its periphery, said sprocket teeth being constructed and arranged to contact at least some of said silent chain teeth to permit power transmission therebetween;

said silent chain teeth being constructed arranged for said inside flanks (23) of said links of a first row of links (2) to contact said teeth of said sprocket upon initial engagement of said link teeth with said sprocket teeth at a first engagement point (A) on said inside flanks, said engagement of said sprocket teeth on said links of said first row links terminating at a second engagement point (B) on said inside flanks, said silent chain teeth being constructed and arranged for said outside flanks (24) of a second row of links (2') to contact said teeth of said sprocket at a third engagement point ($B_0$) along said outside flanks of said second row links subsequent to said engagement of said first row links with said sprocket teeth at said second engagement point (B) on said inside flanks, said second row of links (2') being adjacent to said first row (2) and preceding said first row of links in the direction of travel of said chain as said chain engages said sprocket, said engagement of said second row chain links with said sprocket teeth resulting in seating of said second row links on said sprocket teeth at a seating point (C) along said outside flanks of said second row links, said second engagement point (B) being in the vicinity of said third engagement point ($B_0$).

2. The silent chain and sprocket of claim 1, wherein said second engagement point (B) is substantially coincident with said third engagement point ($B_0$).

3. The silent chain and sprocket of claim 1, wherein said outside flanks of said links seat against said sprocket teeth at a seating point (C) on said outside flanks, said seating point (C) being located on said concave curved surface (24c).

4. The silent chain and sprocket of claim 3, wherein said outside flank convex curved surface (24b) is arcuately shaped.

5. The silent chain and sprocket of claim 4, wherein said links are back-drive-type links (6), said pair of apertures (62, 62) of said links having centerpoints that define a centerline (L) therebetween, each of said links including a pair of teeth (61, 61') on each of the opposite sides of the centerline (L) of said apertures.

* * * * *

UNITED STATES PATENT AND TRADEMARK OFFICE
CERTIFICATE OF CORRECTION

PATENT NO.    : 6,155,945
DATED         : December 5, 2000
INVENTOR(S)   : Akio Matsuda It is certified that error appears in the above-identified patent and that said Letters Patent is hereby corrected as shown below:

<u>Title page,</u>
Under U.S. PATENT DOCUMENTS, reference "4,854,925" changed "Chandrupatia" to -- Chandrupatla --.
Under Inventor, after "Nabari" insert -- City --.

<u>Column 8,</u>
Line 3, after "constructed" insert -- and --.

Signed and Sealed this

Thirteenth Day of August, 2002

Attest:

JAMES E. ROGAN
*Attesting Officer*  *Director of the United States Patent and Trademark Office*